(12) United States Patent
Ganzel

(10) Patent No.: US 11,661,045 B2
(45) Date of Patent: May 30, 2023

(54) SIMULATOR VALVE

(71) Applicant: ZF Active Safety US Inc., Livonia, MI (US)

(72) Inventor: Blaise Joseph Ganzel, Ann Arbor, MI (US)

(73) Assignee: ZF Active Safety US Inc., Livonia, MI (US)

( * ) Notice: Subject to any disclaimer, the term of this patent is extended or adjusted under 35 U.S.C. 154(b) by 277 days.

(21) Appl. No.: 17/188,152

(22) Filed: Mar. 1, 2021

(65) Prior Publication Data

US 2022/0274571 A1    Sep. 1, 2022

(51) Int. Cl.
| | | |
|---|---|---|
| *B60T 8/40* | (2006.01) | |
| *B60T 13/16* | (2006.01) | |
| *B60T 13/12* | (2006.01) | |
| *B60T 13/68* | (2006.01) | |

(Continued)

(52) U.S. Cl.
CPC .............. *B60T 8/409* (2013.01); *B60T 13/12* (2013.01); *B60T 13/161* (2013.01); *B60T 13/66* (2013.01); *B60T 13/686* (2013.01); *F16K 11/18* (2013.01); *B60T 2270/402* (2013.01); *B60T 2270/404* (2013.01); *B60T 2270/82* (2013.01)

(58) Field of Classification Search
CPC .............. F16K 11/18; B60T 2270/402; B60T 2270/404; B60T 2270/82; B60T 13/66; B60T 13/68; B60T 7/06; B60T 8/34; B60T 17/02; B60T 15/00; B60T 15/36
See application file for complete search history.

(56) References Cited

U.S. PATENT DOCUMENTS

| 5,267,785 A | 12/1993 | Maisch |
|---|---|---|
| 5,609,401 A | 3/1997 | Johnston et al. |
| 10,730,501 B2 | 8/2020 | Ganzel |

(Continued)

FOREIGN PATENT DOCUMENTS

| DE | 19836493 B4 | 7/2008 |
|---|---|---|
| DE | 102017203958 A1 | 3/2018 |
| KR | 20220024241 A * | 3/2022 |

OTHER PUBLICATIONS

German Search Report for corresponding German Application Serial No. 10 2022 201 758.7, dated Sep. 9, 2022, pp. 1-10.

*Primary Examiner* — Vishal R Sahni
(74) *Attorney, Agent, or Firm* — Robert James Harwood

(57) ABSTRACT

A simulator valve includes a housing having a pedal simulator passage and a master cylinder passage extending therethrough. The master cylinder passage is located longitudinally between the first housing surface and the pedal simulator passage. An armature is located at least partially within the housing for selective longitudinally reciprocating motion with respect thereto between first and second armature positions. A poppet is located within the housing for selective longitudinally reciprocating motion with respect thereto between first and second poppet positions. The poppet defines a first valve and a second valve the poppet includes a poppet bore extending longitudinally therethrough and selectively occluded by the first valve. A damped flow fluid path selectively permits fluid communication therethrough from the master cylinder passage to the pedal simulator passage. A free flow fluid path selectively permits fluid communication therethrough from the pedal simulator passage to the master cylinder passage.

12 Claims, 6 Drawing Sheets

(51) Int. Cl.
*F16K 11/18* (2006.01)
*B60T 13/66* (2006.01)

(56) References Cited

U.S. PATENT DOCUMENTS

| | | | |
|---|---|---|---|
| 11,027,716 B2 * | 6/2021 | Lee | B60T 7/042 |
| 2019/0100179 A1 * | 4/2019 | Lee | B60T 13/745 |
| 2019/0135256 A1 * | 5/2019 | Lee | B60T 8/409 |
| 2020/0307538 A1 | 10/2020 | Ganzel | |
| 2022/0274571 A1 * | 9/2022 | Ganzel | B60T 13/161 |
| 2022/0274572 A1 * | 9/2022 | Ganzel | B60T 8/366 |
| 2022/0274575 A1 * | 9/2022 | Ganzel | B60T 13/147 |

\* cited by examiner

SIMULATOR VALVE

TECHNICAL FIELD

This disclosure relates to an apparatus and method for use of a simulator valve and, more particularly, to a method and apparatus of a brake pedal simulator valve for controlling and/or adjusting brake pedal drop during transition between manual apply and boosted braking.

BACKGROUND

This invention relates in general to vehicle braking systems. Vehicles are commonly slowed and stopped with hydraulic brake systems. These systems vary in complexity but a base brake system typically includes a brake pedal, a master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster.

During initial movement of the brake pedal unit in boosted mode, the driver pushes on the brake pedal, causing initial movement of an input piston of the master cylinder. Further movement of the input piston will pressurize the input chamber of the master cylinder, causing fluid to flow into a pedal simulator. As fluid is diverted into the pedal simulator, a simulation pressure chamber within the pedal simulator will expand, causing movement of a piston within the pedal simulator. Movement of the piston compresses a spring assembly housed within the pedal simulator and biasing the piston to provide a feedback force to the driver of the vehicle via the brake pedal which simulates the forces a driver feels at the brake pedal in a conventional vacuum assist hydraulic brake system, for example, and therefore is an expected and comforting "brake feel" for the driver.

When the vehicle is first started, the brake fluid is under little to no pressure. In certain cases, the driver manually applies the brake in a "push-through" condition, in which the master cylinder directly energizes pressure to at least two, and often four, of the wheel brakes. As the brake system comes online and pressure builds, the system transitions to a "boost" mode wherein the booster is used to supplement or supplant pressurized fluid sent to the wheel brakes from the driver's push-through force on the brake pedal. However, this is not always a smooth transition and can result in a "pedal drop" condition when the pedal simulator is pressurized that can be discomfiting to the driver.

Descriptions of prior art brake systems are in U.S. Pat. No. 10,730,501, issued 4 Aug. 2020 to Blaise Ganzel and titled "Vehicle Brake System with Auxiliary Pressure Source", and in U.S. Patent Application Publication No. 2020/0307538, published 1 Oct. 2020 by Blaise Ganzel and titled "Brake System with Multiple Pressure Sources", both of which are incorporated herein by reference in their entirety for all purposes.

SUMMARY

In an aspect, a simulator valve is described. A housing has a center bore extending longitudinally from a first housing surface. The housing includes a pedal simulator passage extending therethrough to at least partially place the center bore in fluid communication with a pedal simulator. The housing includes a master cylinder passage extending therethrough to at least partially place the center bore in fluid communication with a master cylinder. The master cylinder passage is located longitudinally between the first housing surface and the pedal simulator passage. An armature is located at least partially within the housing for selective longitudinally reciprocating motion with respect thereto between first and second armature positions. A poppet is located within the housing and is at least partially located within an armature bore of the armature for selective longitudinally reciprocating motion with respect thereto between first and second poppet positions. The poppet defines a first valve cooperatively with a first valve seat of at least a portion of the armature bore. The poppet at least partially defines a second valve longitudinally spaced from, and oppositely facing, the first valve seat. The second valve includes a second valve seat located within the center bore and at least partially spaced apart from a bore wall of the center bore. The poppet includes a poppet bore extending longitudinally therethrough and selectively occluded by the first valve. The armature, poppet, and center bore cooperatively define a damped flow fluid path therebetween. The damped flow fluid path selectively permits fluid communication therethrough from the master cylinder passage to the pedal simulator passage. The damped flow fluid path permits fluid communication therethrough when the armature is in the second armature position and the poppet is in the first poppet position. The armature, poppet, and center bore cooperatively define a free fluid path therebetween. The free flow fluid path selectively permits fluid communication therethrough from the pedal simulator passage to the master cylinder passage. The free flow fluid path permits fluid communication therethrough when the armature is in the second armature position and the poppet is in the second poppet position.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
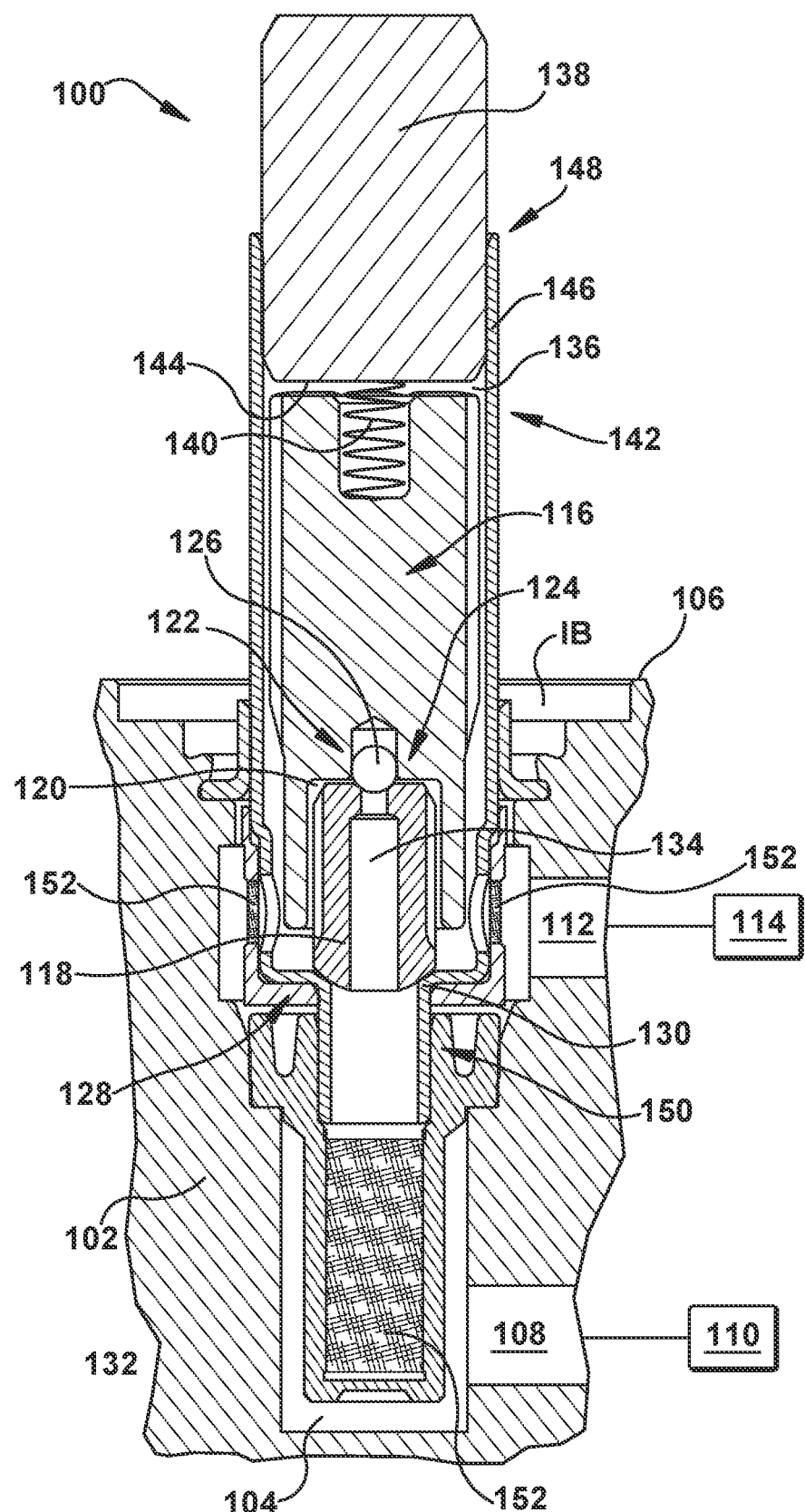
FIG. 1 is a schematic cross sectional side view of a simulator valve according to an aspect of the present invention, in a first condition.

FIG. 1 depicts a simulator valve 100, comprising a housing 102 having a center bore 104 extending longitudinally downward from a first housing surface 106. Although the valve 100 is shown in cross-section in FIGS. 1-3, one of ordinary skill in the art will readily be able to envision the manner in which the component parts of the valve 100 interact three-dimensionally (e.g., in sealing and/or fluid communicating manners) with each other, given the teachings of the present invention. The housing 102 includes a pedal simulator passage 108 extending therethrough to at least partially place the center bore 104 in fluid communication with a pedal simulator (shown schematically at 110). The housing 102 includes a master cylinder passage 112 extending therethrough to at least partially place the center bore 104 in fluid communication with a master cylinder (shown schematically at 114). The master cylinder passage 112 is imposed longitudinally between the first housing surface 106 and the pedal simulator passage 108.

Any suitable number, configuration, and style of additional structures may be provided to the valve 100 to facilitate assembly and/or use thereof, such as, but not limited to, the stepped inner bore IB shown in the Figures.

An armature 116 is located at least partially within the housing 102 for selective longitudinally reciprocating motion with respect to the housing 102. The armature 116 moves between first and second armature positions in any desired manner, such as the electrically and/or magnetically controlled and exerted forces described below with reference to FIGS. 1-3.

A poppet 118 is located within the housing 102 and is at least partially located within an armature bore 120 of the armature 116. The poppet 118 is configured for selective longitudinally reciprocating motion with respect to the armature between first and second poppet positions in any desired manner, such as the electrically and/or magnetically controlled and exerted forces described below with reference to FIGS. 1-3. The poppet 118 at least partially defines a first valve (shown schematically at the area indicated by 122) cooperatively with a first valve seat 124 of at least a portion of the armature bore 120.

As shown in the Figures, the first valve 122 may include a valve ball 126 maintained in longitudinal position with respect to the first valve seat 124 of the armature bore 120. When present, the valve ball 126 may be press-fit into a portion of the armature bore 120, and may be provided for self-sealing, wear-compensation, and/or any other purpose. As shown here, the valve ball 126 interacts sealingly with a shoulder of the poppet 118 to collectively form the first valve 122.

The poppet 118 also at least partially defines a second valve (shown schematically at the area indicated by 128) at a position longitudinally spaced from, and oppositely facing, the first valve seat 124. The second valve 128 includes a second valve seat 130 located within the center bore 104 and at least partially spaced apart from a bore wall 132 of the center bore 104. The poppet 118 includes a poppet bore 134 extending longitudinally therethrough. The poppet bore 134 is selectively occluded by the first valve 122 (e.g., and as will be presumed below, by the valve ball 126 of the first valve 122).

FIG. 1 depicts a situation in which the simulator valve 100 is de-energized, or closed. This situation occurs, for example, when the vehicle and/or a brake system including the simulator valve 100 is in a deactivated state. As can be seen in FIG. 1, a magnetic gap 136 is present between the armature 116 and a core 138, and a core spring 140 is urging the armature 116 downward, in the orientation of FIG. 1, to simultaneously close both the first and second valve seats 124 and 130 by pushing the armature 116 downward upon the poppet 118.

The core 138 is provided for selectively magnetically attracting a first end 142 of the armature 116 longitudinally. The armature 116 is itself longitudinally interposed between the core 138 and the poppet 118. As shown in the Figures, an armature-attracting face 144 of the core 138 may be substantially planar. This is in contrast to the stepped armature-attracting face of known prior art two-stage simulator valves, and may be helpful in attracting the first end 142 of the armature with more efficient and forceful motion than in those known valves. For example, the armature 116 does not need to travel as far to close the magnetic gap 136 with the depicted, substantially planar armature-attracting face 144, compared to known devices.

As mentioned above, the core spring 140 may be interposed longitudinally between the armature 116 and the core 138 to normally bias the armature 116 longitudinally away from the core 138. Magnetic force from the core 138 must then overcome the spring force of the core spring 140 to move the armature 116 from the first position, shown in FIG. 1, to the second position, shown in FIG. 2.

Also as shown in the Figures, a core sleeve 146 may be received at least partially in the center bore 104 of the housing 102 to maintain the core 138 in a predetermined spaced relationship therewith. The armature 116 is at least partially enclosed within the core sleeve 146, and is guided thereby for selective longitudinal reciprocating motion with respect to the core 138, between the first and second armature positions.

It is contemplated that the core sleeve 146 may entirely longitudinally enclose the armature 116 therein. The core 138 may be located at a first end 148 of the core sleeve 146. The core sleeve 146 defines the second valve seat 130 at or adjacent a second end 150 of the core sleeve 146, the second end 150 being longitudinally spaced from the first end 148. As shown in the Figures, the second valve seat 130 may be provided by a shoulder of the core sleeve 146.

As previously mentioned, FIG. 1 depicts the armature 116 in a first (lowermost) armature position. The poppet 118 is maintained in the first (lowermost) poppet position by the armature 116 when the armature 116 is in that first armature position, by virtue of the core spring 140 pushing down on the armature 116 and thereby preventing both the armature 116 and the poppet 118 from traveling upward, in the orientation of FIG. 1

Figure 2:
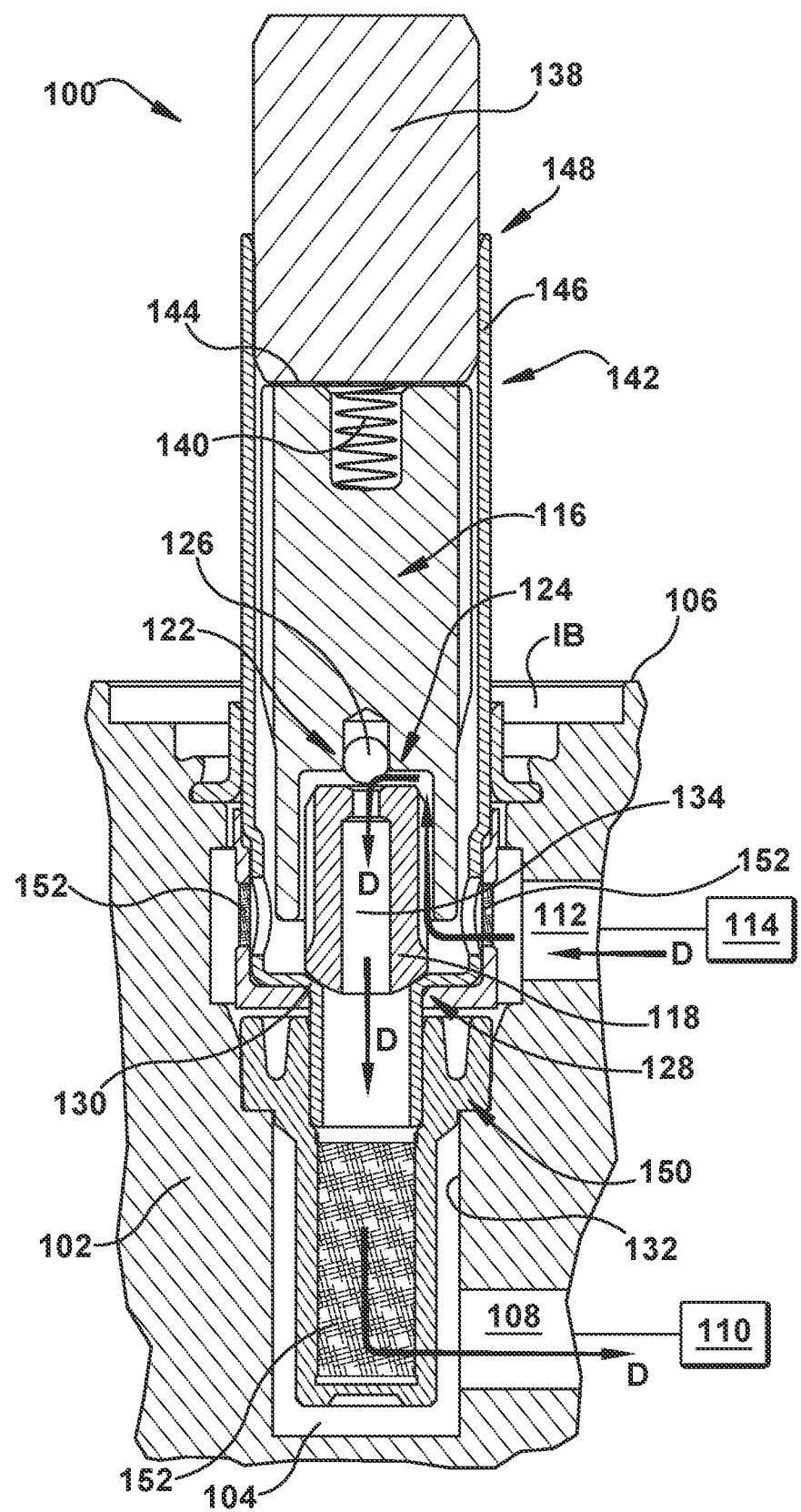
FIG. 2 is a schematic cross sectional side view of the simulator valve of FIG. 1 in a second condition.

Turning now to FIG. 2, the simulator valve 100 is shown in a second, "transition" configuration. (The transition configuration is also the boosted configuration when applying the brake pedal.) The second configuration may occur, for example, when the vehicle is first being started and the brake system of the vehicle is transitioning between a manual apply mode for the brakes and a boosted mode. The armature 116, poppet 118, and center bore 104 collectively and cooperatively define a damped flow fluid path therebetween during this initial or "transition" period of operation of the simulator valve 100; this damped fluid flow path is indicated by arrows "D" in FIG. 2. The damped flow fluid path D selectively permits fluid communication therethrough from the master cylinder passage 112 to the pedal simulator passage 108. The damped flow fluid path D permits fluid communication therethrough when the armature 116 is in the second, raised armature position (by virtue of being attracted magnetically to the core 138) and the poppet 118 is still in the first, lowermost poppet position. As a result, fluid can be sent from the master cylinder 114 (energized at least partially by pressure of the driver's foot upon the brake pedal) to the pedal simulator 110 through the damped fluid flow path D when the brake system is transitioning from manual apply to boosted apply.

During the transition phase, with the simulator valve 100 in the configuration shown in FIG. 2, the dual acting plunger of the brake system pushes fluid into the pedal simulator 110. Active pedal feel control for the driver is then based on the pedal travel sensor, as well as pressure sensor feedback.

When a valve ball 126 is present, longitudinal motion of the poppet 118 away from the armature 116 opens the first valve 122 for fluid flow (that is, the damped fluid flow path D) past the valve ball 126 and into the poppet bore 134. This fluid flow path is created at least partially because the valve ball 126 is maintained (e.g., via a frictional fit with the armature bore 120) in engagement with the armature 116, which moves away from the poppet 118 during the transition from the configuration of FIG. 1 to that of FIG. 2. As a result of this creation of damped fluid flow path D, brake fluid can travel from the dual acting plunger and/or the master cylinder 114 to the pedal simulator 110.

Figure 3:
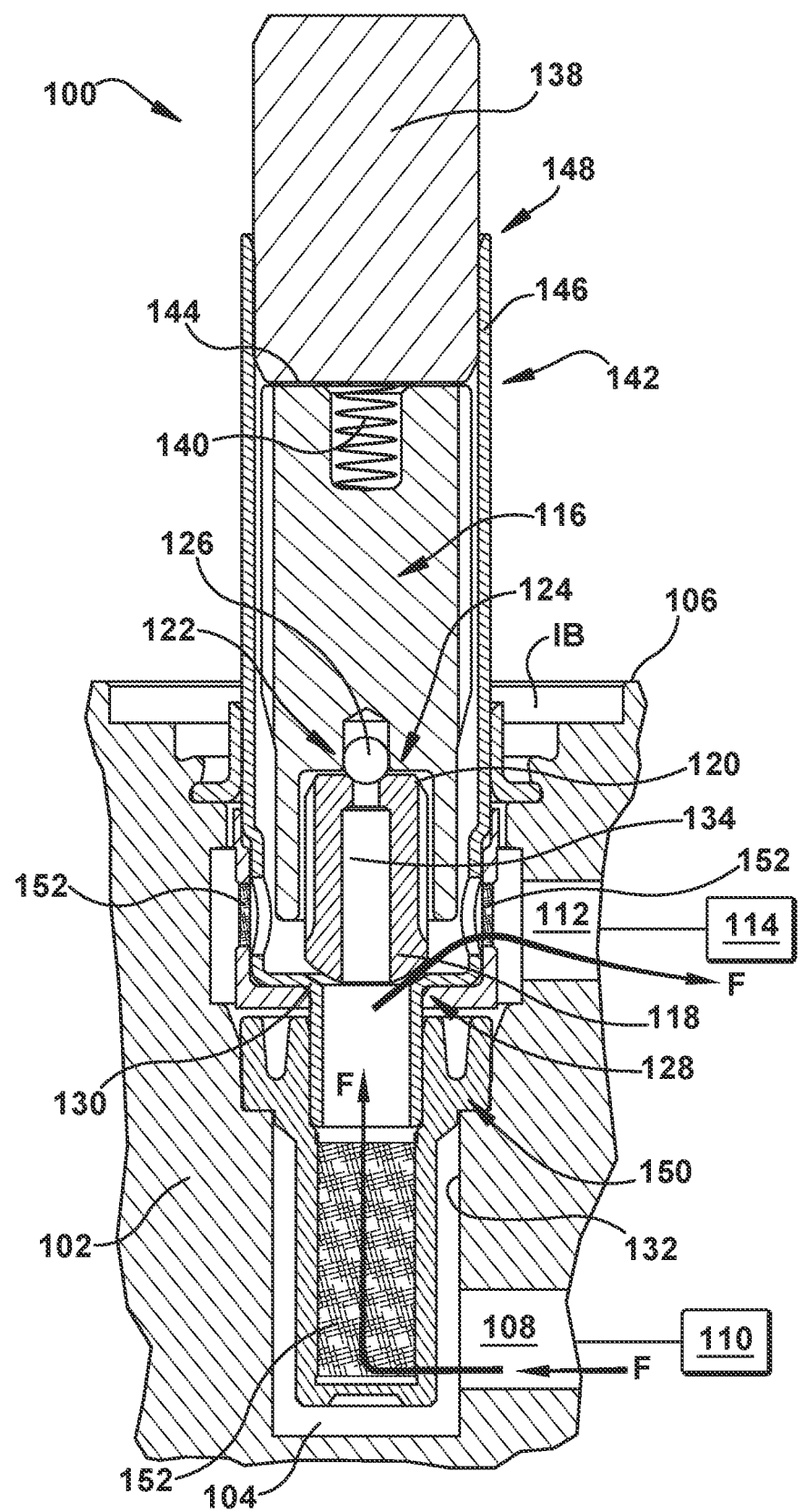
FIG. 3 is a schematic cross sectional side view of the simulator valve of FIG. 1 in a third condition.

With reference now to FIG. 3, backpressure resulting from a buildup of fluid within the pedal simulator 110 has pushed the poppet 118 upward, in the orientation of FIG. 3, into the second poppet position. This is the "boosted" configuration when the driver is releasing the brake pedal. Here, the first valve 122 is once more closed, with renewed contact between the valve ball 126 and the poppet 118. Accordingly, a fluid path through the poppet bore 134 is also no longer available. As a result, the armature 116, poppet 118, and center bore 104 cooperatively define a free fluid path therebetween; this relatively undamped fluid flow path is indicated by arrows "F" in FIG. 3. The free flow fluid path F selectively permits fluid communication therethrough from the pedal simulator passage 108 to the master cylinder passage 112.

The free flow fluid path F permits fluid communication therethrough when the armature 116 is in the second armature position and the poppet 118 is in the second poppet position. Once the free flow fluid path F is established, pedal simulator 110 can be used to selectively feed pressure back into the master cylinder 114 to assist with achieving a suitable pedal feel for the driver, or for any other desired reason. The dual acting plunger will continue to build higher boosted pressure during this mode, based on the driver's request, conveyed via the brake pedal.

FIGS. 2 and 3 show the "boosted apply and release" modes, respectively, for the simulator valve 100, indeed, for the brake system as a whole, and it persists until such time as the vehicle is turned off, or some other event occurs which prompts cessation of the boosted apply situation. The simulator valve 100 is "open" anytime boost is active. Which one(s) of the first and second valve seats 124 and 130 is(are) open depends on if the driver is applying or releasing the brake pedal. Both of the first and second valve seats 124 and 130 could be partially open if the driver is not applying or releasing the brake pedal.

In the event of a loss of power to the solenoid controlling the core 138, either intentional or not, the core spring 140 will overcome the force previously provided by the now-de-energized solenoid and applied magnetically via the core 130, to push the armature 116 back down to the first armature position and thus reestablish the magnetic gap 136 and return the simulator valve 100 to a "manual apply" mode.

With reference again back to FIG. 1, it is contemplated that fluid flow may be permitted along the free flow fluid path F when the armature 116 is in the first armature position and the poppet 118 is in the first poppet position, as shown in FIG. 1. This flow may be permitted when the pressure in the pedal simulator 110 is greater than the pressure in the master cylinder 114 by an amount that can overcome the spring (and other) forces acting on the area of the second valve seat 130. That is, a predetermined amount of fluid may be permitted to flow through the second valve 128, between the second valve seat 130 and the poppet 118, even with the simulator valve 100 in the manual apply, "closed" or de-energized, position. This permissive quality may be helpful in achieving desired efficiencies in the system, as well as brake pedal feel and response characteristics for the driver, and will occur, for example, when fluid pressure in the pedal simulator 110 is higher than fluid pressure in the master cylinder 114. To emphasize the situation of FIG. 1, however, the free and damped flow fluid paths F and D are both substantially blocked from fluid flow when the armature 116 is in the first armature position and the poppet 118 is in the first poppet position—that is, both are in their lowermost position, in the orientation of FIGS. 1-3.

It is also contemplated that at least one of the free and damped fluid flow paths F and D may include at least one filter 152 (two shown in FIGS. 1-3 by way of example) for filtering fluid flow therethrough. When present, the filter(s) 152 may be of any desired type, and may be located in any desired position in the simulator valve 100. For example, the depicted lower filter 152 is located below the poppet 118 in the center bore 104. It is contemplated that a cylindrical upper filter 152 could also or instead be located in an area substantially surrounding the poppet 118; that is, immediately between the master cylinder passage 112 and the core sleeve 146. One of ordinary skill in the art will be readily able to provide one or more suitable filters 152, as desired for a particular use environment of the present invention.

Figure 4:
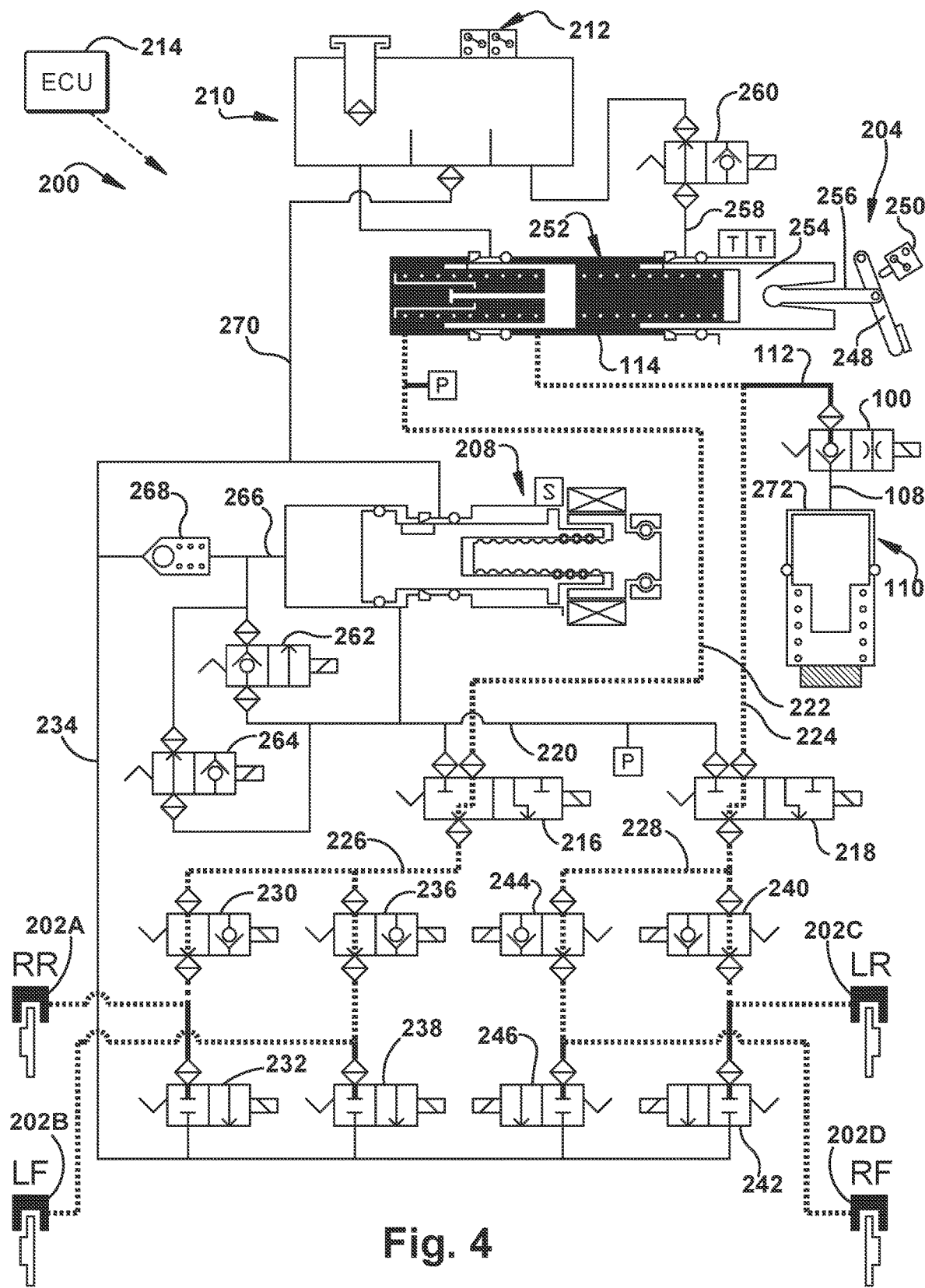
FIG. 4 is a schematic hydraulic diagram, including the simulator valve of FIG. 1, in a first phase of operation.
Figure 5:
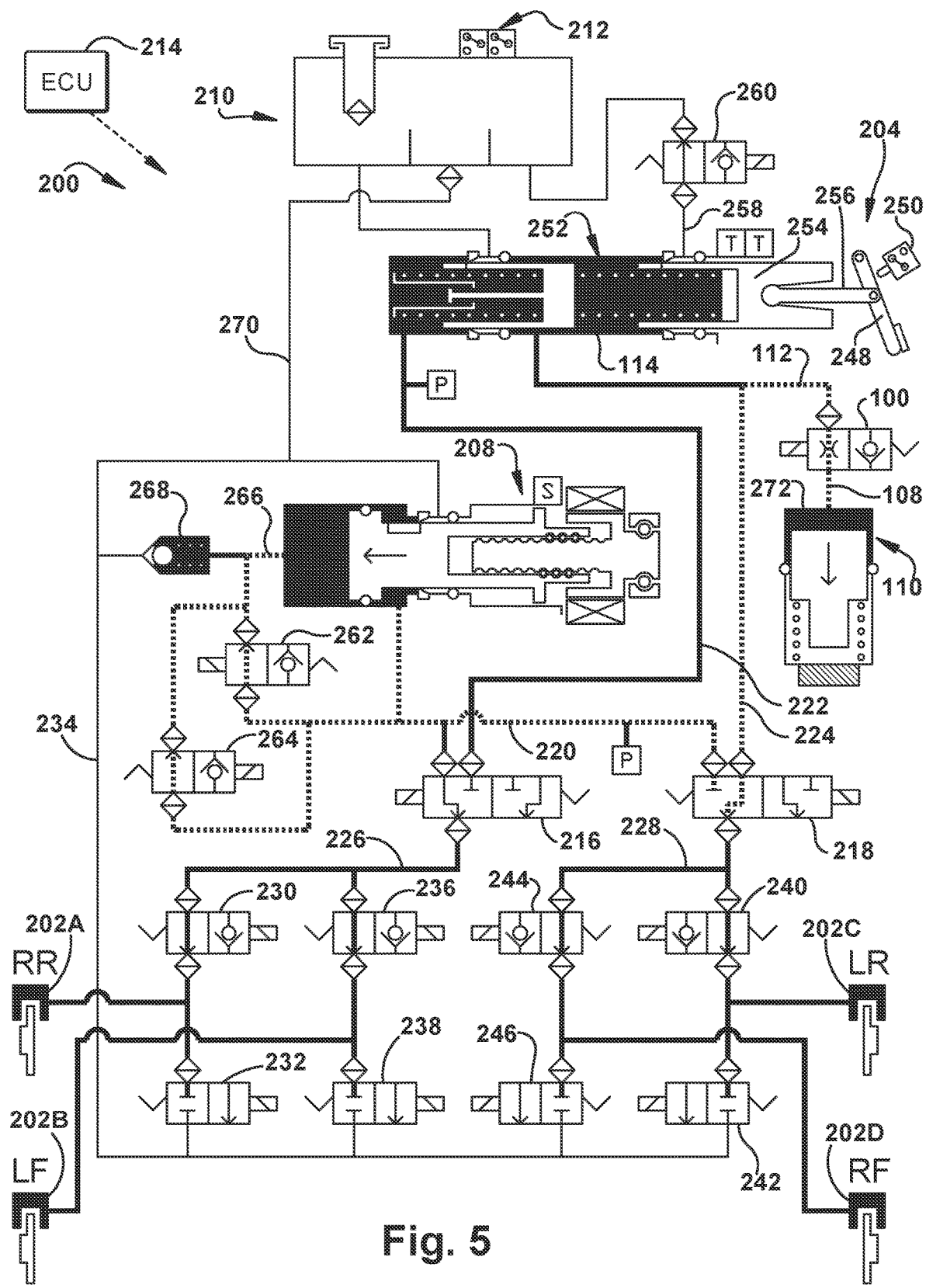
FIG. 5 is a schematic hydraulic diagram, including the simulator valve of FIG. 1, in a second phase of operation.
Figure 6:
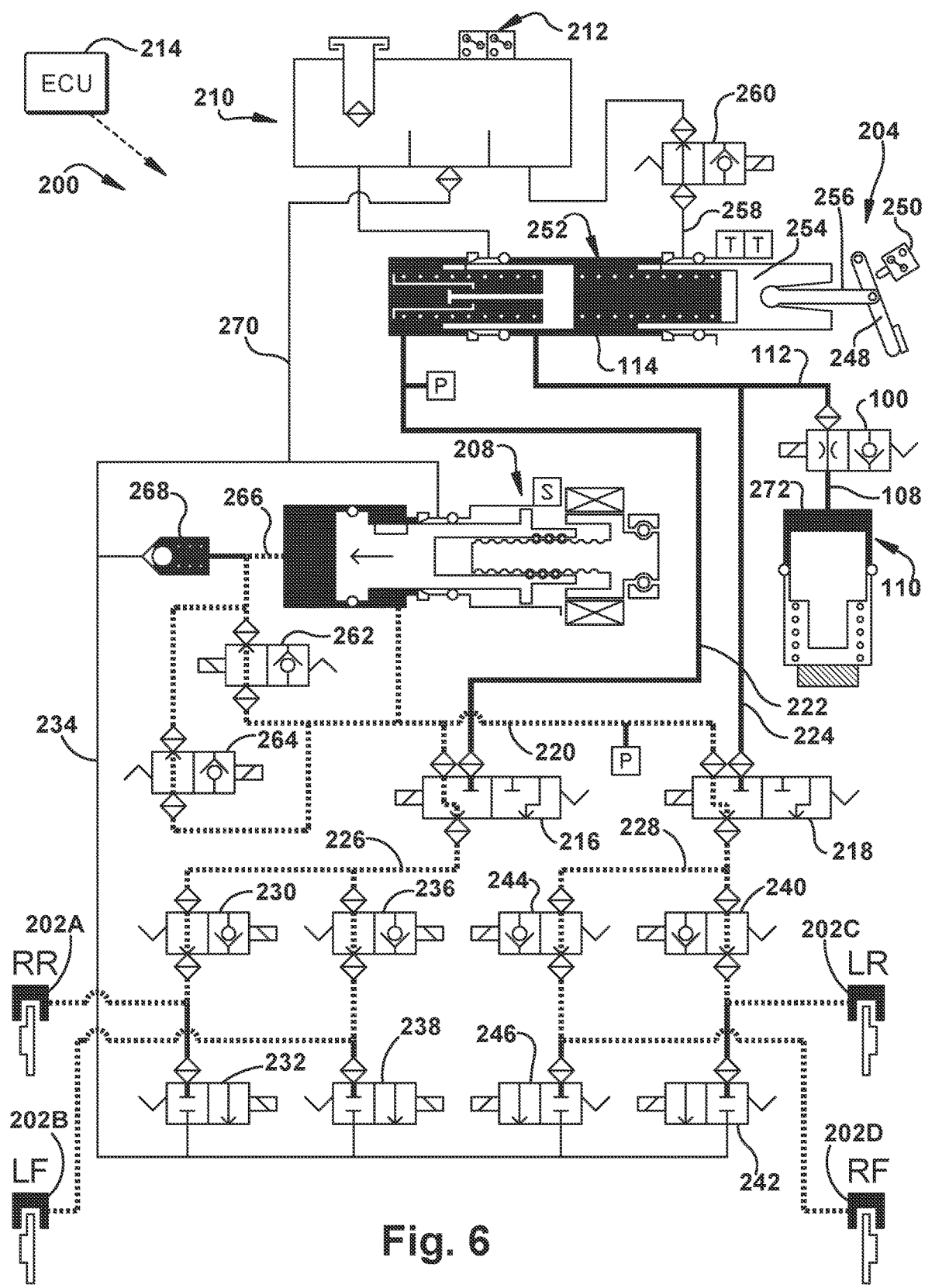
FIG. 6 is a schematic hydraulic diagram, including the simulator valve of FIG. 1, in a third phase of operation.

FIGS. 4-6 schematically depict a brake system 200 utilizing the simulator valve 100 of FIGS. 1-3. In FIGS. 4-6, the "bold", or heavy, lines indicate a component or portion of the brake system 154 which is under fluid pressure. The dotted lines indicate a component or portion of the brake system 200 which is subject, in the modes shown in the Figures, to both pressure and flow of fluid.

The simulator valve 100 is not limited to use in the brake system 200 of FIGS. 4-6, but could be used in any suitable setting in which magnetically-actuated control of hydraulic flow is desirable. For example, the simulator valve 100 could be used in the brake systems shown and depicted in co-pending patent applications U.S. patent application Ser. No. 17/88,227, filed concurrently herewith and titled "Hydraulic Brake Boost", U.S. patent application Ser. No. 17/188,363, filed concurrently herewith and titled "Apparatus and Method for Control of a Hydraulic Brake System", and/or U.S. patent application Ser. No. 17/188,288, filed concurrently herewith and titled "Apparatus and Method for Control of a Hydraulic Brake System", all of which are hereby incorporated by reference in their entirety for all purposes.

The brake system 200 is a hydraulic boost braking system in which boosted fluid pressure is utilized to apply braking forces for the brake system 200. The brake system 200 may suitably be used on a ground vehicle, such as an automotive vehicle having four wheels with a wheel brake associated with each wheel. Furthermore, the brake system 200 can be provided with other braking functions such as anti-lock braking (ABS) and other slip control features to effectively brake the vehicle. Components of the brake system 200 may be housed in one or more blocks or housings. The block or housing may be made from solid material, such as aluminum, that has been drilled, machined, or otherwise formed to house the various components. Fluid conduits may also be formed in the block or housing In the illustrated embodiment of the brake system 200, there are four wheel brakes 202A, 202B, 202C, and 202D. The wheel brakes 202A, 202B, 202C, and 202D can have any suitable wheel brake structure operated by the application of pressurized brake fluid. Each of the wheel brakes 202A, 202B, 202C, and 202D may include, for example, a brake caliper mounted on the vehicle to engage a frictional element (such as a brake disc) that rotates with a vehicle wheel to effect braking of the associated vehicle wheel. The wheel brakes 202A, 202B, 202C, and 202D can be associated with any combination of front and rear wheels of the vehicle in which the brake system 200 is installed. For example, the brake system 200 may be configured as a diagonally split system, as shown, such that a master cylinder secondary pressure circuit is associated with providing fluid to the diagonal wheel brakes 202A and 202B, and a master cylinder primary pressure circuit is associated with providing fluid to the diagonal wheel brakes 202C and 202D. In this example, the wheel brake 202A may be associated with a right rear wheel of the vehicle in which the brake system 200 is installed, and the wheel brake 202B may be associated with the left front wheel. The wheel brake 202C may be associated with the left rear wheel, and the wheel brake 202D may be associated with the right front wheel. Alternatively, though not depicted here, the brake system 10 may be configured as a vertical split brake system such that the wheel brakes 202A and 202B are associated with wheels at the front or rear axle of the vehicle, and the wheel brakes 202C and 202D are associated with wheels at the other axle of the vehicle.

The brake system 200 generally includes a brake pedal unit, indicated generally at 204, a pedal simulator, indicated generally at 110, a plunger assembly (also known as a dual acting plunger), indicated generally at 208, and a fluid reservoir 210. The reservoir 210 stores and holds hydraulic fluid for the brake system 200. The fluid within the reservoir 210 is preferably held at or about atmospheric pressure, but the fluid may be stored at other pressures if desired. The reservoir 210 is shown schematically having three tanks or sections with three fluid conduit lines connected thereto. The sections can be separated by several interior walls within the reservoir 210 and are provided to prevent complete drainage of the reservoir 210 in case one of the sections is depleted due to a leakage via one of the three lines connected to the reservoir 210. Alternatively, the reservoir 210 may include multiple separate housings. The reservoir 210 may include at least one fluid level sensor 212 for detecting the fluid level of one or more of the sections of the reservoir 210.

The plunger assembly 208 of the brake system 200 functions as a source of pressure to provide a desired pressure level to the wheel brakes 202A, 202B, 202C, and 202D during a typical or normal brake apply. After a brake apply, fluid from the wheel brakes 202A, 202B, 202C, and 202D may be returned to the plunger assembly 208 and/or diverted to the reservoir 210. In the depicted embodiment, the plunger assembly 208 is a dual acting plunger assembly which is configured to also provide boosted pressure to the brake system 200 when a piston of the plunger assembly 208 is stroked rearwardly as well as forwardly.

The brake system 200 also includes at least one electronic control unit or ECU 214. The ECU 214 may include microprocessors and other electrical circuitry. The ECU 214 receives various signals, processes signals, and controls the operation of various electrical components of the brake system 200 in response to the received signals. The ECU 214 can be connected to various sensors such as the reservoir fluid level sensor 212, pressure sensors, travel sensors, switches, wheel speed sensors, and steering angle sensors. The ECU 214 may also be connected to an external module (not shown) for receiving information related to yaw rate, lateral acceleration, longitudinal acceleration of the vehicle, or other characteristics of vehicle operation for any reason, such as, but not limited to, controlling the brake system 200 during vehicle braking, stability operation, or other modes of operation. Additionally, the ECU 214 may be connected to the instrument cluster for collecting and supplying information related to warning indicators such as an ABS warning light, a brake fluid level warning light, and a traction control/vehicle stability control indicator light.

The brake system 100 further includes first and second isolation valves 216 and 218. The isolation valves 216 and 218 may be, for example, solenoid actuated three way valves. The isolation valves 216 and 218 are generally operable to two positions, as schematically shown in FIGS. 4-6. The first and second isolation valves 216 and 218 each have a port in selective fluid communication with an output conduit 220 generally in communication with the output of the plunger assembly 208. The first and second isolation valves 216 and 218 also include ports that are in fluid communication with first and second master cylinder conduits 222 and 224, respectively, which are each connected to the brake pedal unit 204, via the master cylinder 114, as shown in FIG. 4. The first and second isolation valves 216 and 218 further include ports that are in fluid communication with first and second wheel brake conduits 226 and 228, respectively, which provide fluid to and from the wheel brakes 202A, 202B, 202C, and 202D.

In some use environments, the first and/or second isolation valves 216 and 218 may be mechanically designed such that flow is permitted to flow in a direction from the output conduit 220 to the first and second wheel brake conduits 226 and 228 and to the first and second master cylinder conduits 222 and 224, respectively, when in their de-energized positions and can bypass the normally closed seat of the valves 216 and 218. Thus, although the 3-way valves 216 and 218 are not shown schematically to indicate this fluid flow position, it is noted that that the valve design may permit such fluid flow. This may be helpful, for example, in performing self-diagnostic tests of the brake system 100.

The brake system 200 further includes various solenoid-actuated valves ("slip control valve arrangement") for permitting controlled braking operations, such as, but not limited to, ABS, traction control, vehicle stability control, dynamic rear proportioning, regenerative braking blending, and autonomous braking. A first set of valves includes a first apply valve 230 and a first dump valve 232 in fluid communication with the first wheel brake conduit 226 for cooperatively supplying fluid received from the first isolation valve 216 to the right rear wheel brake 202A, and for cooperatively relieving pressurized fluid from the right rear wheel brake 202A to a reservoir conduit 234 in fluid communication with the reservoir 210. A second set of valves includes a second apply valve 236 and a second dump valve 238 in fluid communication with the first wheel brake conduit 226 for cooperatively supplying fluid received from the first isolation valve 216 to the left front wheel brake 202B, and for cooperatively relieving pressurized fluid from the left front wheel brake 202B to the reservoir conduit 234. A third set of valves includes a third apply valve 240 and a third dump valve 242 in fluid communication with the second wheel brake conduit 228 for cooperatively supplying fluid received from the second isolation valve 218 to the left rear wheel brake 202C, and for cooperatively relieving pressurized fluid from the left rear wheel brake 202C to the reservoir conduit 234. A fourth set of valves includes a fourth apply valve 244 and a fourth dump valve 246 in fluid communication with the second wheel brake conduit 228 for cooperatively supplying fluid received from the second isolation valve 218 to the right front wheel brake 202D, and for cooperatively relieving pressurized fluid from the right front wheel brake 202D to the reservoir conduit 234. Note that in a normal braking event, fluid flows through the de-energized open apply valves 230, 236, 240, 244. Additionally, the dump valves 232, 238, 242, 246 are preferably in their de-energized closed positions during normal braking to prevent unwanted flow of fluid to the reservoir 210.

The brake pedal unit 204 is connected to a brake pedal 248 and is actuated by the driver of the vehicle as the driver presses on the brake pedal 248. A brake sensor or switch 250 may be connected to the ECU 214 to provide a signal indicating a depression of the brake pedal 248. The brake pedal unit 204 may be used as a back-up source of pressurized fluid to essentially replace the normally supplied source of pressurized fluid from the plunger assembly 208 under certain failed conditions of the brake system 200, and/or upon initial startup of the brake system 200. This situation is referred to as a manual push-through event, or a "manual apply", and is the situation shown in FIG. 4. The brake pedal unit 204 can supply pressurized fluid to the first and second master cylinder conduits 222 and 224 (that are normally closed off at the first and second isolation valves 216 and 218 during a normal brake apply) to the wheel brakes 202A, 202B, 202C, and 202D as desired. This situation is depicted in FIG. 4 schematically by showing the master cylinder 114 and the wheel brakes 202A, 202B, 202C, and 202D as being under pressure (depicted as bolded), with both pressure and fluid flow through at least the first and second master cylinder conduits 222 and 224, the first and second wheel brake conduits 226 and 228, and from then on to the wheel brakes 202A, 202B, 202C, and 202D. This flow is pushed through, largely under mechanical pressure upon the brake pedal 248 from the driver's foot, from the master cylinder 114. With reference back to the simulator valve 100, the situation shown in FIG. 1 is present in the circuit of FIG. 4, with both the armature 116 and the poppet 118 in their first positions.

As shown schematically in FIGS. 4-6, the brake pedal unit 204 includes a master cylinder with a housing 252 for slidably receiving various cylindrical pistons and other components therein. Note that the housing is not specifically schematically shown in the Figures, but instead the walls of the bore are illustrated. The housing 252 may be formed as a single unit or include two or more separately formed portions coupled together. An input piston 254 is connected with the brake pedal 248 via a linkage arm 256. Leftward movement of the input piston 254 may cause, under certain conditions, a pressure increase within the master cylinder 114.

The master cylinder 114 is in fluid communication with the pedal simulator 110 via a master cylinder passage 108. The input piston 254 is slidably disposed in the bore of the housing 252 of the master cylinder 114. When the brake pedal unit 204 is in its rest position (the driver is not depressing the brake pedal 248), the structures of the master cylinder 114 permit fluid communication between the bore of the housing 252 and the reservoir 210 via a reservoir conduit 258.

The brake system 200 may further include an optional solenoid actuated simulator test valve 260 which may be electronically controlled between an open position and a powered closed position. The simulator test valve 260 is not necessarily needed during a normal brake apply or for a manual push-through mode. The simulator test valve 260 can be actuated to a closed position during various testing modes to determine the correct operation of other components of the brake system 200. For example, the simulator test valve 260 may be actuated to a closed position to prevent venting to the reservoir 210 via the reservoir conduit 258 such that a pressure build up in the brake pedal unit 204 can be used to monitor fluid flow to determine whether leaks may be occurring through seals of various components of the brake system 200.

The brake system 200 further includes a first plunger valve 262, and a second plunger valve 264. The first plunger valve 262 is preferably a solenoid actuated normally closed valve. Thus, in the non-energized state, as shown in FIG. 4, the first plunger valve 262 is in a closed position. The second plunger valve 264 is preferably a solenoid actuated normally open valve. Thus, in the non-energized state, the second plunger valve 264 is in an open position, as shown in the Figures. A check valve may be arranged within the second plunger valve 264 so that when the second plunger valve 264 is in its closed position, fluid may still flow through the second plunger valve 264 in the direction from the first plunger output conduit 266 (from the plunger assembly 208) to the output conduit 220 leading to the first and second isolation valves 216 and 218. During a rearward stroke of the piston of the plunger assembly 208, pressure may be generated within the plunger assembly 208 for output into the output conduit 220. The brake system 200 further includes a check valve 268 permitting fluid to flow in the direction from the conduit 270 (from the reservoir to 10) to the conduit 266 and into the plunger assembly 208, such as during a pressure generating rearward stroke of the piston of the plunger assembly 208.

During initial manual push through operation of the brake pedal unit 204, sufficient leftward movement of the input piston 254 will prevent the flow of fluid from the master cylinder 114 into the reservoir conduit 258 and thus into the reservoir 210, but will put the system into a flow-through state, where the driver's foot applies pressure to the master cylinder 114, which then flows fluid (responsive to that pressure from the brake pedal 248) through the first and second master cylinder conduits 222 and 224, the first and second isolation valves 216 and 218, the first and second wheel brake conduits 226 and 228, and on to the wheel brakes 202A, 202B, 202C, and 202D. Further leftward movement of the input piston 254 will pressurize the master cylinder 114, causing fluid to flow into the pedal simulator 110 via the pedal simulator passage 108, which is concurrently being opened in the transition portion of operation of the simulator valve 100, illustrated in FIG. 2 and described above. As fluid is diverted into the pedal simulator 110, the pedal simulator 110 provides a feedback force to the driver of the vehicle via the brake pedal 248. This feedback force simulates the forces a driver feels at the brake pedal 248 in a conventional vacuum assist hydraulic brake system, for example.

A simulation pressure chamber 272 of the pedal simulator 110 is in fluid communication with the pedal simulator passage 108, which is in fluid communication with the master cylinder 114 of the brake pedal unit 204. As shown in FIGS. 4-6, the solenoid actuated simulator valve 100 (described above in detail with reference to FIGS. 1-3) is positioned between the pedal simulator passage 108 and the master cylinder passage 112 to selectively control the flow of fluid between the master cylinder 114 and the pedal simulator 110 for any desired reason. One example of desired operation of the simulator valve 100 is during a failed and/or initial/startup condition, in which the brake pedal unit 204 is utilized to provide a source of pressurized fluid to the wheel brakes 202A, 202B, 202C, and 202D in a push-through manner, as described herein.

In summary, then, a brake system 200 is provided for actuating a pair of front wheel brakes 202B, 202D and a pair of rear wheel brakes 202A, 202C. (The front and rear wheel brakes 202A, 202B, 202C, and 202D could be actuated, as desired, in any order or sequence, any combination(s), or otherwise individually or in groups as desired for a particular use environment. While a diagonal brake system is shown herein as an example, it is contemplated that the present invention could be used with a split brake system or any other configuration, whether or not currently known.) The system includes a reservoir 210 for holding fluid and a master cylinder 114 operable during a manual push-through mode by actuation of a brake pedal 248 connected to the master cylinder 114 to generate brake actuating pressure. The brake actuating pressure is applied at first and second outputs (e.g., first and second master cylinder conduits 222 and 224) for actuating the pair of front wheel brakes 202B, 202D and the pair of rear wheel brakes 202A, 202C. A source of pressurized fluid (here, the plunger assembly 208) is provided for actuating the pair of front wheel brakes 202B, 202D and the pair of rear wheel brakes 202A, 202C during a non-failure normal braking event. An electronic control unit 214 is provided for controlling the source of pressurized fluid. A pedal simulator 110 is in selective fluid communication with the master cylinder. The brake system 200 further includes the simulator valve 100 shown and described herein, which selectively permits fluid communication between the master cylinder 114 and the pedal simulator 110.

In use, the brake system 200 moves from a startup, or "manual apply" mode, through a "transition" mode, into a steady state "boosted" mode, as described above with reference to FIGS. 1-3, respectively. A manual apply mode is generally only entered if a boosted startup is not available for a particular starting sequence. FIGS. 4-6 schematically depict the condition and operation of the brake system 200 as a whole, respective to those three modes.

In FIG. 4, the "manual apply" mode, the simulator valve 100 is in the de-energized, or closed, position shown in FIG. 1. The driver is just starting to apply foot pressure to the brake pedal 248, which pressurizes the master cylinder 114 (as indicated by the bold shading of that component), and causes fluid to flow (as indicated by the dotted lines of these components) through first and second master cylinder conduits 222, 224 and first and second wheel brake conduits 226, 228, and from there directly to the wheel brakes 202A, 202B, 202C, and 202D. Again, this is a push-through situation where the driver's foot pressure upon the brake pedal 248 is directly pushing brake fluid to the wheel brakes 202A, 202B, 202C, and 202D.

During the shift from the configuration of FIGS. 1 and 4 to the "boosted" configuration of FIG. 2 and the "transition" configuration of FIG. 5, at least the simulator valve 100, the plunger assembly 208, the first plunger valve 262, and the first isolation valve 216 are electrically actuated, which causes the brake system 200 to move into the "transition" mode. (As a side note, though second isolation valve 218 is not yet energized at this point, a predetermined amount of flow through that second isolation valve 218 may be permitted, to help to dampen or soften the transition phase, as desired.)

With reference now to FIG. 5, at least the master cylinder 114, the first and second master cylinder conduits 222, 224 and first and second wheel brake conduits 226, 228, the check valve 268, and the hydraulic lines leading directly to the wheel brakes 202A, 202B, 202C, and 202D, are held under a desired amount of pressure, and the simulator valve 100 has moved into the position shown in FIG. 2. Accordingly, the armature 116 has been magnetically pulled by the core 138 upward, in the orientation of FIG. 2, into the second armature position, thus pulling the valve ball 126 away from the poppet 118 (which remains in the first poppet position) and opening the damped fluid flow path D. As a result, fluid is permitted to flow from the master cylinder 114, through the damped fluid flow path D, and into the pedal simulator 110.

The "transition" mode passes rather quickly (on the order of a small fraction of a second to one or two seconds, depending on a number of other factors), and once the pedal simulator 110 has attained sufficient pressurization (represented by the downward arrow within the simulation pressure chamber 272 in FIG. 5), the system enters the "boosted apply" mode, as shown schematically for the entire brake system 200 in FIG. 6.

With reference to FIG. 6, the second isolation valve 218 has been actuated (in addition to the previously actuated components). The "boosted apply" mode shown in FIG. 6 includes the master cylinder 114, the plunger assembly 208, the check valve 268, the pedal simulator 110, the first and second master cylinder conduits 222, 224, and the wheel brakes 202A, 202B, 202C, and 202D (along with portions of the wheel brake hydraulics leading to the dump valves 232, 238, 242, 246) either "holding" fluid pressure or helping to prevent fluid flow back to the reservoir 210 while boost pressure is permitted to ebb and flow. Fluid is permitted to flow, under pressure, through the output conduit 220, the first and second wheel brake conduits 226, 228, and through the apply valves 230, 236, 240, 244 to the wheel brakes 202A, 202B, 202C, and 202D. The plunger assembly 208 continues to build higher boosted pressure based upon the driver's request, and the ECU 214 controls the system to carry out braking requests from the driver during further operation of the brake system 200 until there is a system failure or the vehicle is deactivated.

It is contemplated that pedal drop (the "feel" of the brake pedal to the driver) during the transition between manual apply and boost braking, using the simulator valve 100 shown and described herein, can be actively controlled and adjusted based on customer preferences. A brake system including the simulator valve 100 according to aspects of the present invention could also allow a user to eliminate pedal drop if that transition pedal feel is preferred.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A simulator valve, comprising:
   a housing having a center bore extending longitudinally from a first housing surface, the housing including a pedal simulator passage extending therethrough to at least partially place the center bore in fluid communication with a pedal simulator, the housing including a master cylinder passage extending therethrough to at least partially place the center bore in fluid communication with a master cylinder, the master cylinder passage being located longitudinally between the first housing surface and the pedal simulator passage;
   an armature located at least partially within the housing for selective longitudinally reciprocating motion with respect thereto between first and second armature positions;
   a poppet located within the housing and at least partially located within an armature bore of the armature for selective longitudinally reciprocating motion with respect thereto between first and second poppet positions, the poppet defining a first valve cooperatively with a first valve seat of at least a portion of the armature bore, and the poppet at least partially defining a second valve longitudinally spaced from, and oppositely facing, the first valve seat, the second valve including a second valve seat located within the center bore and at least partially spaced apart from a bore wall of the center bore, the poppet including a poppet bore extending longitudinally therethrough and selectively occluded by the first valve;

wherein the armature, poppet, and center bore cooperatively define a damped flow fluid path therebetween, the damped flow fluid path selectively permitting fluid communication therethrough from the master cylinder passage to the pedal simulator passage, the damped flow fluid path permitting fluid communication therethrough when the armature is in the second armature position and the poppet is in the first poppet position; and wherein the armature, poppet, and center bore cooperatively define a free fluid path therebetween, the free flow fluid path selectively permitting fluid communication therethrough from the pedal simulator passage to the master cylinder passage, the free flow fluid path permitting fluid communication therethrough when the armature is in the second armature position and the poppet is in the second poppet position.

2. The simulator valve of claim 1, including a core for selectively magnetically attracting a first end of the armature longitudinally, the armature being longitudinally interposed between the core and the poppet.

3. The simulator valve of claim 2, wherein an armature-attracting face of the core is substantially planar.

4. The simulator valve of claim 2, including a core spring interposed longitudinally between the armature and the core to bias the armature longitudinally away from the core.

5. The simulator valve of claim 2, wherein a core sleeve is received at least partially in the center bore of the housing to maintain the core in spaced relationship therewith, the armature being at least partially enclosed within the core sleeve and guided thereby for selective longitudinal reciprocating motion with respect to the core.

6. The simulator valve of claim 5, wherein the core sleeve entirely longitudinally encloses the armature therein, with the core located at a first end of the core sleeve, and the core sleeve defines the second valve seat at a second end of the core sleeve.

7. The simulator valve of claim 1, wherein the first valve includes a valve ball maintained in longitudinal position with respect to the first valve seat, wherein longitudinal motion of the poppet away from the armature opens the first valve for fluid flow past the valve ball and into the poppet bore.

8. The simulator valve of claim 1, wherein the free and damped flow fluid paths are both substantially blocked from fluid flow when the armature is in the first armature position and the poppet is in the first poppet position.

9. The simulator valve of claim 8, wherein a predetermined amount of fluid flow is permitted along the free flow fluid path when the armature is in the first armature position and the poppet is in the first poppet position.

10. The simulator valve of claim 1, wherein at least one of the free and damped fluid flow paths includes a filter for filtering fluid flow therethrough.

11. The simulator valve of claim 1, wherein the poppet is maintained in the first poppet position by the armature when the armature is in the first armature position.

12. A brake system for actuating a pair of front wheel brakes and a pair of rear wheel brakes, the system comprising:
a reservoir;
a master cylinder operable during a manual push-through mode by actuation of a brake pedal connected to the master cylinder to generate brake actuating pressure at first and second outputs for actuating the pair of front wheel brakes and the pair of rear wheel brakes;
a source of pressurized fluid for actuating the pair of front wheel brakes and the pair of rear wheel brakes during a non-failure normal braking event;
an electronic control unit for controlling the source of pressurized fluid; and
a pedal simulator in selective fluid communication with the master cylinder;
wherein the brake system further includes the simulator valve of claim 1 selectively permitting fluid communication between the master cylinder and the pedal simulator.

\* \* \* \* \*